United States Patent [19]

Tibbals, Jr.

[11] Patent Number: 5,022,629
[45] Date of Patent: * Jun. 11, 1991

[54] VALVE CONSTRUCTION

[75] Inventor: Edward C. Tibbals, Jr., Jamestown, N.C.

[73] Assignee: Interface, Inc., LaGrange, Ga.

[*] Notice: The portion of the term of this patent subsequent to Jul. 18, 2006 has been disclaimed.

[21] Appl. No.: 372,267

[22] Filed: Jun. 27, 1989

Related U.S. Application Data

[63] Continuation of Ser. No. 140,546, Jan. 4, 1988, Pat. No. 4,848,725.

[51] Int. Cl.5 ............................................ F16K 31/08
[52] U.S. Cl. .......................... 251/129.02; 251/129.01; 251/129.08; 251/129.07; 251/129.17
[58] Field of Search .............. 251/905, 129.02, 129.08, 251/129.07, 129.17, 129.01

[56] References Cited

U.S. PATENT DOCUMENTS 4,142,684 3/1979 Schweitzer .
4,350,319 9/1982 Kawata et al. .
4,726,389 2/1988 Minoura et al. .

FOREIGN PATENT DOCUMENTS

| 1322945 | 2/1963 | France ................................ 251/905 |
| 10163 | 1/1980 | Japan . |
| 0130115 | 8/1982 | Japan .................................. 251/905 |
| 0081282 | 5/1983 | Japan .................................. 251/905 |
| 1230715 | 5/1971 | United Kingdom . |
| 2175452 | 11/1986 | United Kingdom . |

OTHER PUBLICATIONS

Kimble, Moving Coil Actuators, in "Machine Design" at pages 117-121 (Sep. 10, 1987).

Primary Examiner—Arnold Rosenthal
Attorney, Agent, or Firm—Kilpatrick & Cody

[57] ABSTRACT

Fluid flow control valve in which bidirectional displacement of a valve operator is effected by momentary utilization of high current flow in a permanent magnetic flux field and longer term utilization of minimal current flow with in said flux field to maintain valve operator position in limiting displaced condition.

17 Claims, 4 Drawing Sheets

VALVE CONSTRUCTION

This application is a continuation of application Ser. No. 07/140,546 filed Jan. 4, 1988, now U.S. Pat. No. 4,848,725, filed July 18, 1989.

This invention relates to fluid flow control valves and more particularly to an improved high speed valve assembly for dye jet fabric or carpet printing systems.

A myriad of valve assemblies of differing manual, mechanical and electromechanical constructions have long been employed to control the initiation and cessation of fluid flow, gaseous or liquid, through conduits as well as to control the rate of fluid flow intermediate the foregoing limits through such conduits. The operating characteristics of particular valve assemblies are normally responsive to the desired operational parameters at the locus of use thereof. One of such operating parameters is frequently the rapidity of valve operating time in response to an externally generated demand signal directed thereto and one of the continuing problems of this art has been satisfaction of the needs for an ever increasing rapidity of valve operating times. Conventionally the art has heretofore responded to such needs for increased rapidity of valve response time by resort to various electromechanical techniques such as the use of continually improved constructions for solenoid actuated valve operators and the like. While such electromechanical expedients, such as improved solenoids, have been able to satisfy a large part of the demands of the art for enhanced rapidity of response time, the response limitations inherent in hysteresis loop operational parameters have effectively established a practical and theoretical limit to attainable rapidity of valve operator response through utilization of such expedients.

In more particularity dye or ink jet printing, while of widespread utility in various areas, has been usefully employed in textile printing systems for the past decade and one specialized field of usage has been in the controlled application of various colored dyes to pile fabrics and carpets. The jet type printing assemblies employed for the patterned application of such colored dyes have conventionally employed a valve for each dye that includes a movable and spring biased valve stem whose displacement has been controlled by one or more solenoids and wherein the colored dye is directed to the valve or jet delivery port through a relatively large annulus surrounding the solenoid means. Such solenoid operated dye jet valve systems, due primarily to the limitations inherent in electromagnetic hysteresis loop operation have an inherently limited valve response time and a relative energy inefficient pattern of operation. Moreover, such solenoid operated valves are subject to undesired amounts of heat generation. Such heat generation is of particular concern in the pile fabric and carpet printing fields, where certain of the colored dyes employed often tend to thicken when exposed to heat and where such viscosity increases function to compound the inherent hysteresis loop operational problems outlined above.

This invention may be briefly described, in its broader aspects, as an improved fluid flow valve assembly which includes hysteresis-free electrically induced bidirectional displacement of a normally floating valve system operator. In a somewhat narrower aspect, the subject invention includes the momentary utilization of very high current flow in a permanent magnetic flux field to effect rapid displacement of the valve stem and the longer term utilization of minimal current flow in such permanent magnetic flux field when the valve stem is at dwell in either an open or shut limiting position. In a still narrower aspect, the subject invention includes flexible lateral support of a longitudinally displaceable hollow valve stem that defines, in part, a confined internal path for fluid flow along the longitudinal axis of a drive coil assembly.

Among the advantages of the subject invention is the provision of an improved construction for fluid flow control valves that permits the utilization of low mass reciprocating elements with markedly reduced response times; the absence of moving ferro-magnetic materials and consequent freedom from hysteresis loop operational restrictions; the utilization of a constant magnitude flux field; reduced power requirements and a simplified and inexpensive control system therefore. Still other advantages include marked reductions in generated heat, reduced volumes of dye or other fluid disposed in transit within the valve assembly, the isolation of the dye flow conduit from the operative flow control elements and a permitted ease of disassembly for cleaning and repair.

The primary object of this invention is the provision of an improved construction for fluid flow control valves.

Another primary object of this invention is the provision of an improved valve assembly for dye jet printing of pile fabrics and carpets.

Other objects and advantages of this invention will become apparent from the following portions of this specification and from the appended drawings which illustrate, in accord with the mandate of the patent statutes, a presently preferred valve construction for dye jet carpet and pile fabric printing that incorporates the principles of this invention.

Referring to the drawings.

Figure 7A:
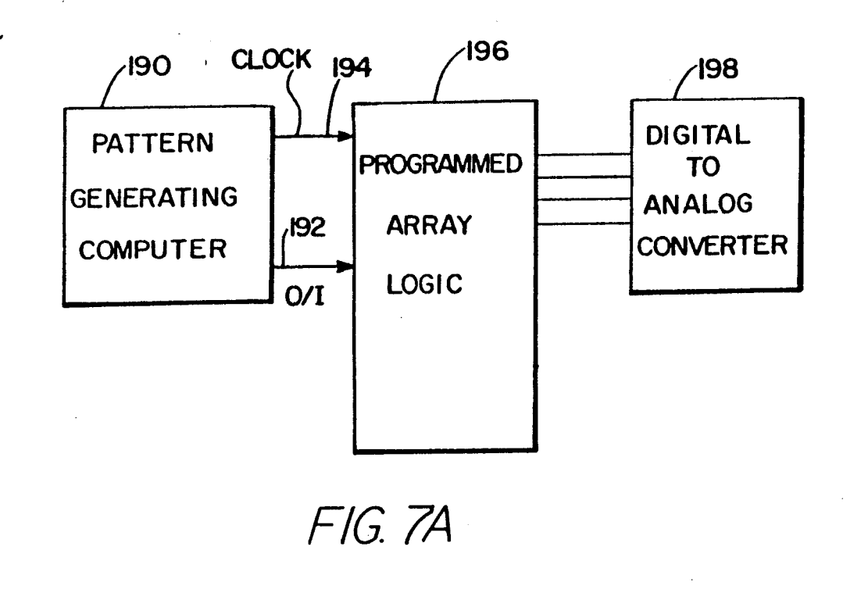
FIGS. 7A-B is a schematic circuit diagram of a control circuit for the valve assembly illustrated in FIGS. 1-6.
Figure 7B:
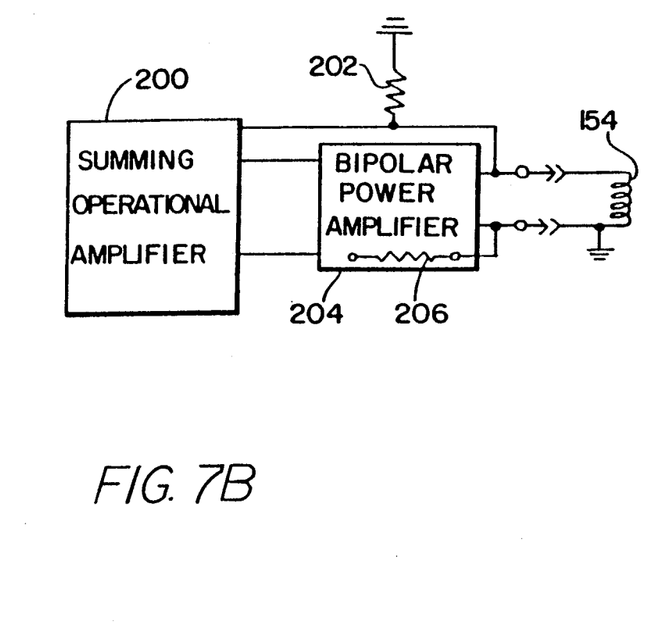

The embodiment of the improved valve assembly construction illustrated in FIGS. 1-6 and the control circuit schematically depicted in FIGS. 7A-B has been specifically designed and proportioned to replace solenoid operated valve assemblies currently being employed in the dye jet spraying of carpet sections in apparatus of the type manufactured by the Zimmer Corporation of Klagenfurt, Austria. As such, the depicted construction is intended to be generally illustrative of the basic principles underlying this invention as well as to be specifically illustrative of a presently preferred construction particularly adapted for the dye jet spraying of carpet sections.

As noted above and as will become hereinafter more apparent, the specifically illustrated embodiment is particularly adapted to eliminate most of the problems inherent in current commercially employed solenoid actuated valves for the dye jet printing of carpet sections. To such end, and as clearly depicted in FIG. 1, the specifically illustrated embodiment includes a linear fluid flow channel extending along the longitudinal axis of the valve assembly from a fluid entry port at one end to a fluid delivery port at the other end, with such channel being adapted to minimize the volume of dye contained at an time within the valve assembly and to also minimize the time of exposure of such contained volume of dye to the deleterious effects of any heat extant within the valve assembly.

Referring to the drawings and particularly to FIGS. 1-6, the improved valve assembly is of generally cylindrical configuration and includes a fluid entry port 12 at its upper terminus, constituted by the bore 14 of a generally cylindrical connector fitting 16 adapted to accommodate connection of a remote source of dye thereto. The fluid entry port 12 is disposed coaxial to the longitudinal axis 10 of the valve assembly and is fixedly located in such position by a surrounding dependently flanged power connector bushing member 20 of insulating material and a threaded clamping ring 22 of non magnetic material, suitably brass. Disposed immediately beneath the power connector bushing 20 is an insulating spacer disc 24 having a threaded upper bore 26 sized to contain the dependent threaded boss portion 28 of the power connector bushing 20 and a reduced diameter lower bore 30 encircling the upper end of an elongate fluid flow conductor tube 32. An O-ring 18 is interposed between the entry port 12 and the tube 32. The bores 26 and 30 and the tube 32 are disposed coaxial with the longitudinal axis 10 and form a continuation of the fluid flow channel from the fluid entry port 12.

Positioned immediately beneath the spacer disc 24 and disposed in encircling relation with the tube 32 is a flux focusing magnet assembly cover plate 34 formed of a highly permeable cobalt-vanadium alloy, suitably an alloy formed of 49% cobalt, 49% iron and 2% vanadium. The upper portion of the plate 34 is peripherally threaded, as at 36 for threaded engagement with the dependent skirt portion of the clamping ring 22, for compressive maintenance of the fitting 16, bushing 20 and spacer disc 24 therebetween. The cover plate 34 includes an internally threaded dependent skirt portion 38 disposed in threaded engagement with the upper end of a generally cylindrical elongate outer magnetic pole element 40. Such outer magnetic pole element 40 additionally serves as a continuation of the cylindrical housing for the valve assembly.

Figure 3:
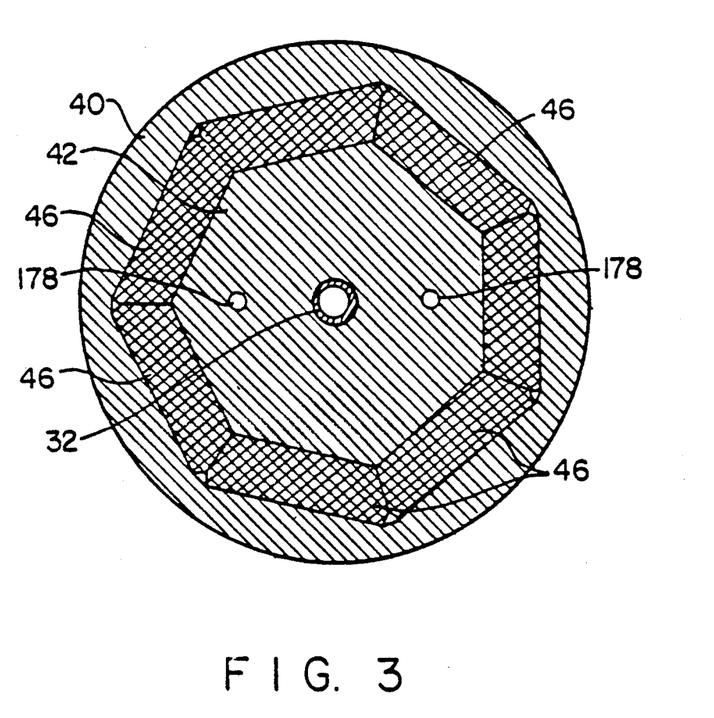
FIG. 3 is a horizontal section taken on the line 3—3 of FIG. 1.
Figure 4:
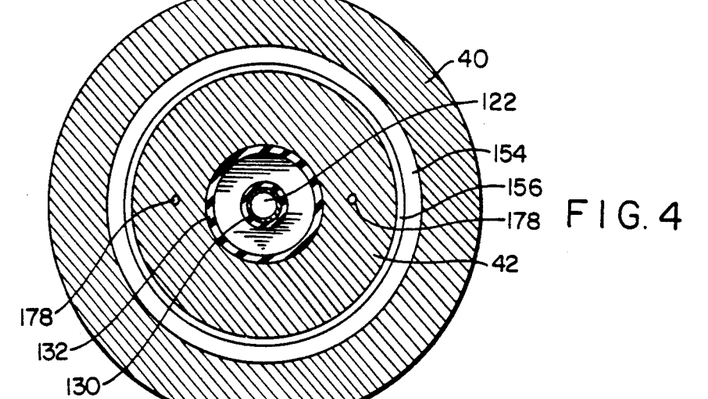
FIG. 4 is a horizontal section taken on the line 4—4 of FIG. 1.
Figure 5:
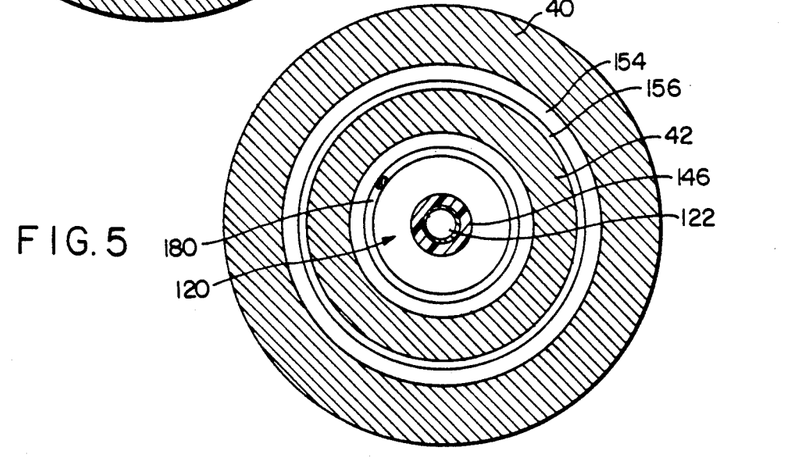
FIG. 5 is a horizontal section taken on the line 5—5 of FIG. 1.
Figure 6:
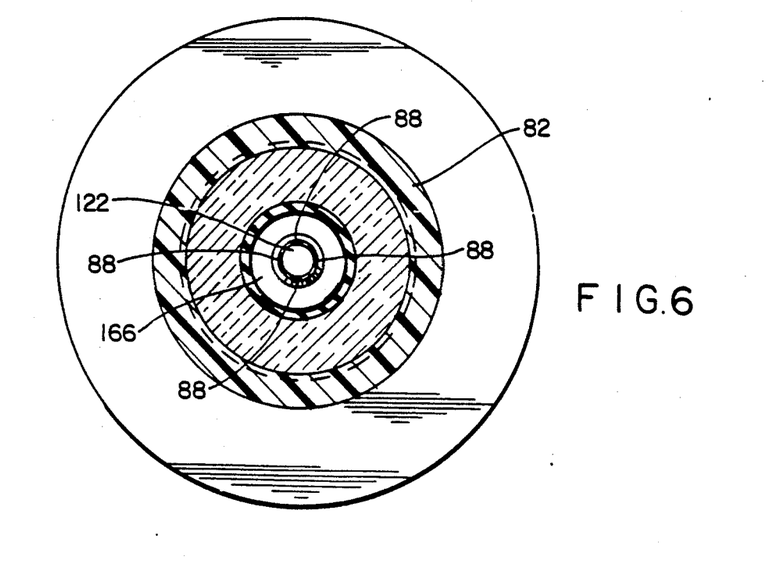
FIG. 6 is a horizontal section taken on the line 6—6 of FIG. 1.

Disposed in concentric spaced relation within the outer magnetic pole element 40 is a fixed and generally cylindrical inner magnetic pole element 42 forming an elongate annulus 44 therebetween. As will be hereinafter described in detail, the upper portion of the inner magnetic pole element 42 surrounds the tube 32 and the lower portion thereof contains a series of selectively sized bores of generally increasing diameter. As best shown in FIG. 3 the inner surface of the upper portion of the outer magnetic pole element 40 and the facing outer surface of the inner magnetic pole element are of hexagonal configuration to accommodate an interposed permanent magnet ring formed of a plurality, here suitably six, samarium-cobalt permanent magnets 46 positioned in abutting relation with each other. Another samarium-cobalt permanent magnet 48 is positioned intermediate the top of the inner magnetic pole element 42 and the undersurface of the cover plate 34. As shown by legend on FIG. 1 each of the magnets has its North pole face (N) in interfacial contact with the surface of the inner magnetic pole element 42. As now will be apparent the permanent magnets 46, 48 function, in association with the inner and outer magnetic pole elements 40 and 42 and the cover plate 34 to form a generally cylindrical horseshoe magnet assembly and to create a strong and substantially constant magnitude magnetic flux field across the portion of the annulus 44 below the magnets 46 that is disposed essentially perpendicular to the longitudinal axis 10 of the valve assembly.

The magnetic cover plate 34, the magnet 48 and the upper portion of the inner magnetic pole element 42 each contain an axial bore coaligned with the longitudinal axis 10 and sized to closely contain the hollow tube 32. The tube 32 is fixedly positioned by a threaded locking ring 50 and fluid leakage externally of the tube 32 is prevented by an interposed sealing ring 58.

Disposed beneath the locking ring 50 is an enlarged bore 110 dependently terminating in an outward bevel 112 whose lower diametric extant defines a further enlarged and elongate bore 54 disposed within the dependent skirt portion 52 of the inner magnetic pole element 42.

Figure 1:
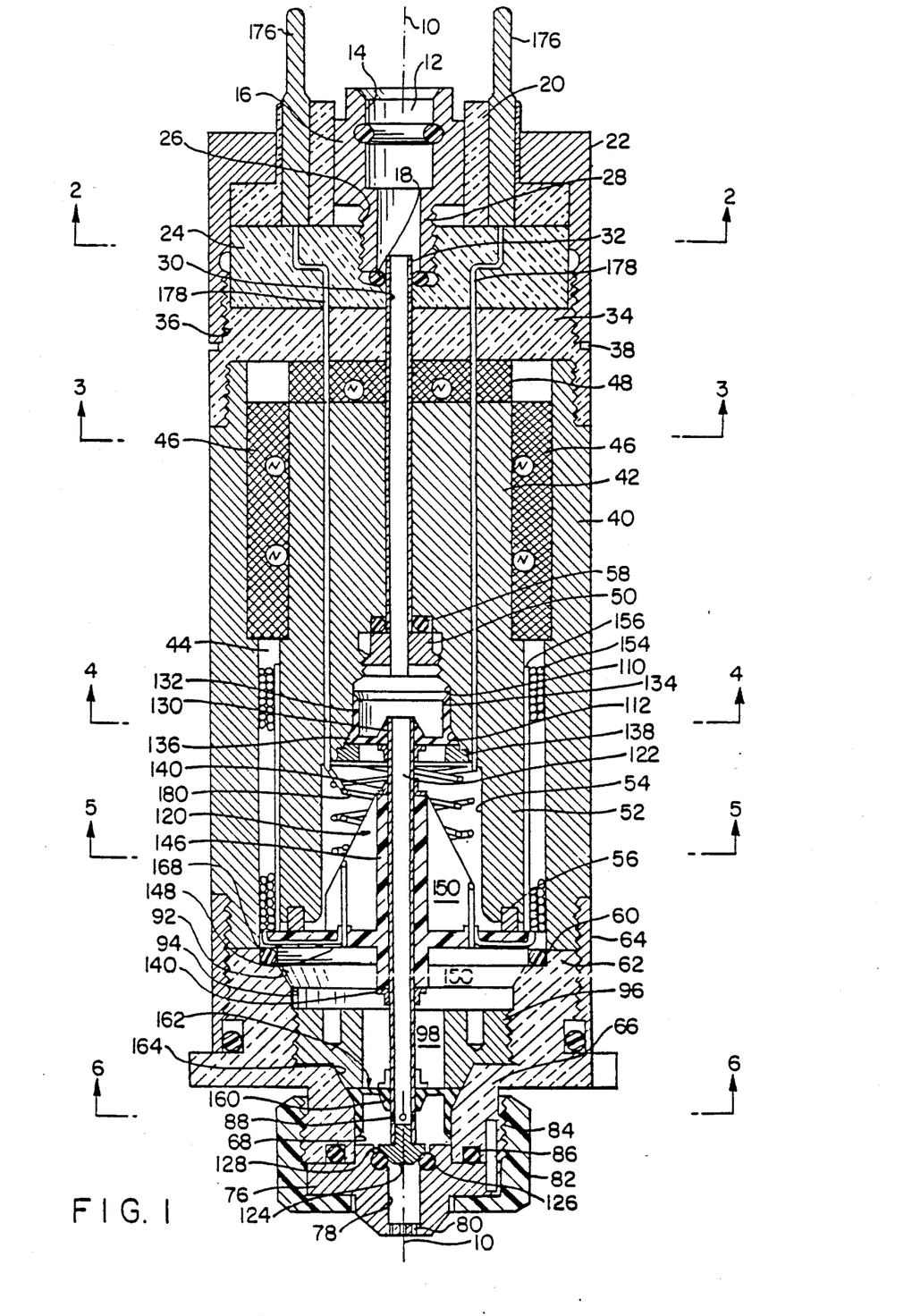
FIG. 1 is a vertical sectional view through a valve assembly incorporating the principles of this invention as particularly adapted for the dye jet printing of pile fabric and carpets.
Figure 2:
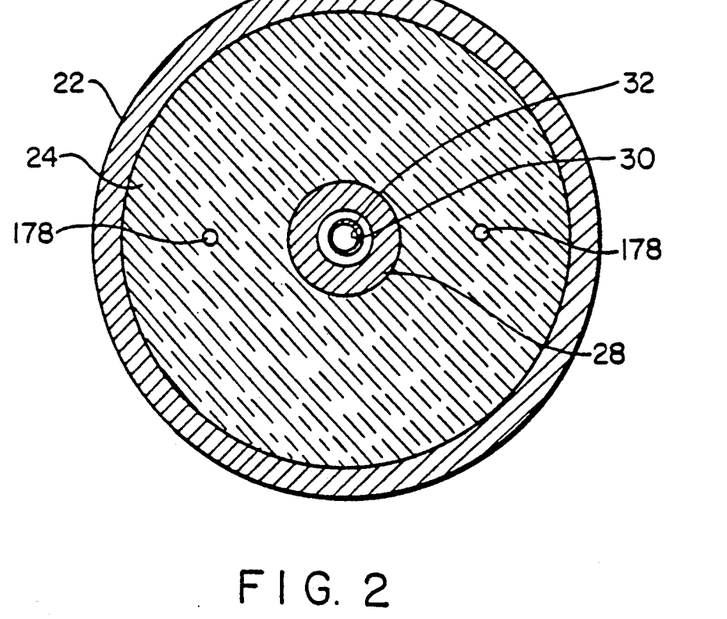
FIG. 2 is a horizontal section taken on the line 2—2 of FIG. 1.

As best shown in FIG. 1 the lower end of the inner magnetic pole element 42 is suitably recessed to accommodate a travel limiting bumper ring 56 preferably of rectangular, rather than round, cross section and formed of resilient deformable material that resists taking a compression set at elevated temperatures. The outer magnetic pole element 40 is of slightly greater longitudinal extent than the inner magnetic pole element 42. Its lower terminal end 60 abuts the upper end of a selectively shaped lower end plate 62 that, in association with the internally threaded non-magnetic sleeve 64 effectively closes the dependent end of the housing assembly for the illustrated valve as well as isolating the above described magnetic circuit.

The dependent end 66 of the lower end plate 62 is of reduced diameter and defines a selectively shaped and reduced diameter bore 68 coaxial with the longitudinal axis 10. Disposed in abutting relation with the dependent end 68 of the sealing ring is a nozzle spray tip element 76, suitable formed of steel, and having a bore 78 coaxial with longitudinal axis 10 and vented by a plurality of liquid jet delivery channels 80. The nozzle spray tip element 76 is maintained in fluid tight abutting engagement with the undersurface of end plate 62 by a brass or other non magnetic clamping nut 82 threadedly engaging, as at 84, the exterior surface of the reduced diameter dependent end portion of the end plate 62 with a sealing ring 86 interposed therebetween.

The upper portion of the end plate 62 includes a first tapered or bevelled bore 92 communicating with a second bore 94 of reduced diameter and having a diaphragm retention ring 96 threadedly mounted therein. The diaphragm retention ring 96 has an axial bore 98 concentric with the longitudinal axis 10.

Disposed intermediate the nozzle element 76 and the locking ring 50 is a resiliently mounted longitudinally displaceable armature assembly, generally designated 120. Included in such armature assembly is an elongate hollow valve stem tube 122 disposed coaxial with the longitudinal axis 10 and having a plurality of apertures 88 located closely adjacent to the dependent end thereof. The dependent end of the hollow valve stem tube 122 is closed by a plug element 124 adapted to be seated in fluid tight sealing engagement with a sealing ring 126 mounted in the perphery of a tapering bore 128 in the upper portion of the nozzle element 76.

The upper end of the valve stem tube 122 is mounted in a hub 130 extending from the planar base portion of a selectively shaped resilient sealing diaphragm member 132 whose peripheral flange or wall 134 is disposed in fluid tight sealing engagement with the defining walls of the bores 110 and 112 in the inner magnetic pole element 42. As shown in FIG. 1, the configuration of the outer surface of the peripheral wall 134 is complemental to that of the bores 110 and 112 and includes a progressively outwardly thickening and beveled lower portion 136. The resilient sealing diaphragm 132 is compressively maintained within the bores 110 and 112 by a retention ring 138.

Mounted on the mid portion of the hollow valve stem tube 122 by suitable support collars 140 is an actuator core member 146 having a disc like circular plate portion 148 supported by webs 150 and extending transverse to the longitudinal axis 10. The plate portion 148 is of sufficient diameter as to have its periphery disposed closely adjacent to the bottom of the inner wall of the outer magnetic pole element 40 and at the base of the annulus 44 intermediate the inner and outer magnetic pole elements 42 and 40 respectively. The actuator core member 146 desirably should be formed of non conductive, resinous material of a character that is dimensionally stable over a broad temperature range. Mounted on the periphery of the circular disc portion 148 and extending upwardly within the annulus 44 is a coil 154 wound on a cylindrical form 156. The coil 154 is suitably of the general type conventionally employed in audio sound systems and generally termed a "voice coil". The cylindrical form 156 is made of non conductive, high strength resinous material having a high modulus of elasticity so as to maximize its strength to weight ratio and desirably should also be creep resistant and dimensionally stable at high temperatures.

The lower end of the hollow valve stem tube 122 is mounted in and extends through a hub 160 extending from the planar base portion of a second selectively shaped resilient sealing diaphragm member 162. The second sealing diaphragm member 162 is desirably identical in construction with the heretofore described first sealing diaphragm member 132 mounted on the upper end of the hollow valve stem tube 122 and is compressively disposed within the tapered and straight bores 164 and 68 in the end plate 62 by the diaphragm retention ring 96.

As will now be apparent, the above described armature construction provides a continuation of the fluid flow channel along the longitudinal axis 10 through the bore 14 in the fluid inlet fitting 16, the fixed hollow tube 30, locking ring 50, the hollow valve stem tube 122 and through the apertures 88 at the lower end thereof into a reservoir 166 formed by the bore 68, nozzle element 76 and second sealing diaphragm member 162. Fluid flow from such reservoir 166 through the nozzle element 76 is controlled by the positioning of the plug element 124 relative to the sealing ring 126 on the tapered valve seat 128.

As will now also be apparent the armature assembly 120 as constituted by the hollow valve stem tube 122, actuator core 146, coil 154, coil form 156, and valve plug 124, as supported by the upper and lower resilient sealing diaphragms 132 and 162, is resiliently mounted relative to the inner and outer magnetic pole elements 42 and 40 and is capable of limited displacement parallel to the longitudinal axis 10 intermediate a first limiting position where the plug 124 is disposed in fluid flow preventing sealing engagement with the sealing ring 126 and a second limiting position where the plug 124 is withdrawn from such sealing engagement to permit fluid flow from the reservoir 166 therepast and into the nozzle element 76. Such limiting positions are defined, at least in part, by the engagement of the upper surface of the actuator core disc or plate 148 with the upper travel limiting bumper ring 56 mounted in the dependent end of the inner magnetic core element 42 and by the engagement of the lower surface of actuator core disc or plate member 148 with a lower travel limiting bumper ring 168 mounted in the upper surface of the lower end plate 62. The lower travel limiting bumper ring 168 is also preferably of rectangular, rather than circular, cross-section and is formed of resilient deformable material that resists taking a compression set at elevated temperatures.

The upper and lower sealing diaphragms 132 and 162 respectively not only function to laterally position and support the armature assembly 120, as described above, but also operate to confine fluid flow through the valve stem tube 122 by preventing leakage at either end thereof while still being capable of sufficient flexure to permit limited axial displacement of the armature assembly including the valve stem tube 122. To such ends, such sealing diaphragms 132 and 162 are desirably constituted of creep resistant, high strength rubber having a low modulus of elasticity and a high resistance to fatigue failure. Also, as noted above, the upper and lower sealing diaphragms should be of the same size and shape so as to balance the fluid pressure forces against which the armature assembly operates and to thus allow the armature assembly to be displaced without having to overcome any net biasing forces that would attend a pressure imbalance on the diaphragms.

Electric connections to the armature coil 154 are effected through the external connectors 176, leads 178 and springs 180 disposed intermediate the actuator core plate 148 and the retention ring 138 for the upper sealing diaphragm 132. The springs 180 perform no biasing function but merely serve as flexible conduits for transmission of electrical current.

In the operation of the above described valve assembly, the armature assembly is preferably disposed in an intermediate floating position with the disc or plate 148 floating between the bumper rings 56 and 168 when no current is flowing in the armature coil 154. If current is passed in one direction through the coil 154, for example clockwise, a force will be created, due to interaction with the fixed magnetic field across the annulus 44, to displace the entire armature assembly downwardly to place the plug element 124 in firm sealing engagement with the sealing ring 126, to thereby close and seal off the fluid flow path therepast. Conversely if current is passed through the coil 154 in the opposite, or counterclockwise, direction the generated force will operate to displace the entire armature assembly in the opposite or upward direction and to thus remove the plug 124 from sealing engagement with the ring 126 and to open the fluid flow channel therepast.

The above described voice coil type of displaceable armature assembly is basically free of hystereis loop operational limitations and is capable of responding and acting much more rapidly than solenoid actuated valves. However such coil 154 is only capable of accepting limited current flow without burn out. In accord therewith, operation of the described valve will be preferably characterized by utilization of high current flows for very short periods of time to effect armature displacement and utilization of very low current flows to maintain the armature assembly in displaced position.

In the depicted construction, the force that is generated to effect armature assembly displacement will be proportional to the instantaneous magnitude of the current flowing within the coil 154 and, as a consequence thereof, it is desirable to apply a high current for a short period of time in order to initiate a rapid change in armature position. Conversely, only a very low level of current flow through the coil 154 need be employed to maintain armature assembly position at dwell in either the fully open or fully closed position. By way of illustrative example, if the coil 154 is one inch in diameter and contains 320 turns and the magnetic flux field across the annulus 44 between the inner and outer magnetic pole elements 42 and 40 is eight kilogauss, a current flow of 3 amperes will create a displacement force of 5 pounds. Such 5 pound force, when applied to an armature assembly of the type described weighing about 15 grams, will exert an acceleration of 151 "g"s to induce displacement of the armature assembly. Of course, a current flow of 3 amperes, if maintained for any significant period of time, will burn out the coil 154. Consequently, in accord with the practice of this invention, it is desirable to induce armature displacement by only a momentary or very short term application of such high current—for example, the above noted 3 amperes, and to maintain the position of the displaced armature assembly against either the upper or lower limiting bumpers 56 or 168, through continued current flow at a greatly reduced and minimal level of, for example, about 200 milliamperes, well below the burn out current for the coil 154.

As pointed out above, the preferred mode of operation for the described structure requires the application of high current flow for extremely short periods of time to induce armature assembly displacement to either the closed or open positions and the utilization of much lower current levels to maintain armature assembly position at either of the foregoing limiting positions. Such utilization of a moving coil actuator, see e.g. Kimble Moving Coil Actuators, Machine Design, Sept. 10, 1987, pp 117-121, results not only in an enhanced rapidity of response time through avoidance of hysteresis losses, but an avoidance of back lash, irregular motion and energy loss normally attendant converting rotating to linear motion as well as no torque generation or force ripple characteristic of other power transmission systems.

A suitable circuit for accommodating such mode of operation and for preventing coil burn out as adapted for computer controlled die jet printing of carpet sections, is schematically depicted in FIGS. 7A-B. Such control circuit includes, a pattern generating computer 190 capable of emitting signals indicative of a desired change in valve position, as for example, a displacement of the armature assembly from a nozzle closed to a nozzle open position to start a flow of dye from the nozzle 76 or vice versa, for each valve in a plurality thereof for selective delivery of a particular color. Such signals appear on the O/I data line 192 and a master clock or timing signal appears on line 194. The lines 192 and 194 feed two programmed array logic units 196 which, upon receipt of a signal, start stepping through a series, for example, sixteen preprogrammed time interval steps as set by the clock pulse input on line 194. A suitable programmed array logic unit is Model No. 16R4 as manufactured by Monolithic Memories of Santa Clara, Calif. The output of the logic units 194, which constitute a timed series of desired current magnitude values expressed as one of eight preselected digital numbers, is applied to a digital to analog converter unit 198. A suitable digital to analog converter is a TAC 0830 as manufactured by National Semiconductors of Santa Clara, Calif. As each of the digital numbers is received in timed sequence, the digital to analog converter 198 resets its output voltage signal to a summing operational amplifier 200 in accord with the desired magnitude of current flow. A suitable summing operational amplifier is LF442A manufactured by National Semiconductors. The summing amplifier 200 is also responsive to the voltage drop across a current sensing feedback resistor 202 connected in parallel with the armature coil 154 and adjusts the output voltage fed to a bipolar power amplifier 204 in such manner as to nullify any difference between a desired magnitude of current to be flowing through the coil 154 and the actual amount flowing therethrough as determined by the voltage drop across the feedback resistor 202. A suitable bipolar power amplifier is a Burr Brown OPA541 and an associated high voltage power source. In the manner described above a digitally programmed functional relationship between time and current magnitude can be effected in the armature coil 154. As pointed out above, the current flow through the coil 154 will initially be relatively high to initially induce armature displacement and then rapidly but progressively decreased to a minimal current value required to maintain the armature assembly in a dwell position.

As is now apparent the foregoing control system does not employ armature position feedback to the amplifier. Rather the system employs the instantaneous sensing of the magnitude of the current flowing through the coil 154, which is affected by both the inductance of the coil 154 and the back EMF which results from the velocity of armature displacement in a fixed magnetic field.

The above described control circuit also desirably includes an overriding safety feedback resistor 206 to prevent the amplifier 204 from generating currents, albeit for a short period of time, that are in excess of the capabilities of the wire employed in coil 154.

Having thus described my invention, I claim:

1. A valve assembly for control of fluid flow, comprising:
   (a) a fluid inlet;
   (b) a fluid outlet having an associated valve seat;
   (c) a pair of fixed magnetic pole elements positioned coaxial with a predetermined axis;
   (d) means for generating substantially constant magnetic flux between the pair of pole elements;
   (e) a valve stem supported by a first elastically deformable diaphragm and displaceable along the predetermined axis between a first position, in which the valve stem forms a seal with the valve seat to prevent fluid from reaching the fluid outlet, and a second position remote from the valve seat;
   (f) an armature assembly mounted on the valve stem and comprising a coil capable of passing current produced by the generated magnetic flux, for displacing the valve stem between the first and second positions; and in which the elastically deformable diaphragm comprises a base plate portion, a hub portion encircling the valve stem, and a peripheral flange portion sealed with a bore defining a portion of the channel through which fluid flows.

2. A valve assembly according to claim 1 in which the flux generating means comprises permanent magnets and the coil is a voice coil.

3. A valve assembly according to claim 2 in which the fixed magnetic pole elements are cylindrically configured and form a portion of a housing for the valve assembly.

4. A valve assembly according to claim 1 further comprising a second elastically deformable diaphragm for supporting the valve stem.

5. A valve assembly according to claim 1 in which the elastically deformable diaphragms normally bias the valve stem between the first and second positions when no current is passing through the coil.

6. A valve assembly for control of fluid flow, comprising:
(a) fluid inlet port means;
(b) fluid outlet port means;
(c) a valve seat associated with said fluid outlet port means;
(d) a hollow, fluid-conveying valve stem supported by elastically deformable diaphragm means to permit selective displacement thereof along a predetermined lineal axis intermediate a first limiting position in sealing relation with said valve seat for preventing fluid flow therepast for discharge through said outlet port means and a second limiting position remote from said valve seat for permitting fluid flow therepast for discharge through said outlet port means;
(e) a pair of fixed magnetic pole elements disposed coaxial with said linear axis and in concentric spaced relation to each other;
(f) flux generating means for establishing a substantially constant magnetic flux between said pair of pole elements in a direction substantially perpendicular to said linear axis; and
(g) an armature assembly mounted on said valve stem and displaceable in direction parallel to said linear axis for displacing said valve stem between its first and second limiting positions, said armature assembly including a coil member capable of carrying electrical current disposed in said magnetic flux intermediate said pair of fixed magnetic pole elements.

7. A valve assembly as set forth in claim 6 where in said flux generating means comprises permanent magnets.

8. A valve assembly as set forth in claim 6 wherein said coil member is a voice coil.

9. A valve assembly as set forth in claim 6 wherein said magnetic pole elements are of cylindrical configuration.

10. A valve assembly as set forth in claim 6 where said fixed magnetic pole elements include an inner magnetic pole member and an outer magnetic pole member disposed in surrounding spaced relation therewith and forming part of a housing element for said valve assembly.

11. A valve assembly for control of fluid flow, comprising:
(a) a fluid inlet port, a fluid outlet port, means defining a fluid flow channel therebetween and a valve seat in said fluid flow channel for control of fluid flow through said outlet port;
(b) a hollow valve stem forming a portion of said fluid flow channel and resiliently supported by a pair of spaced elastically deformable diaphragm means so as to be selectively displaceable along its longitudinal axis intermediate a first limiting position in sealing relation with said valve seat for preventing fluid flow therepast and a second limiting position remote from said valve seat for permitting fluid flow therepast for discharge through said outlet port;
(c) an inner magnetic pole element disposed intermediate said fluid inlet and fluid outlet ports;
(d) an outer magnetic pole element disposed in surrounding spaced relation with said inner magnetic pole element and defining an annulus therebetween;
(e) flux generating means for establishing a substantially constant magnetic flux across said annulus intermediate said inner and outer magnetic pole elements; and
(f) an armature assembly mounted on said valve stem for displacing the latter intermediate its first and second limiting positions, said armature assembly including a voice coil member capable of carrying electrical current mounted for conjoint displacement with said valve stem and disposed within said magnetic flux across said annulus.

12. A valve assembly as set forth in claim 11 wherein said inner and outer magnetic pole elements are of cylindrical configuration and said flux generating means comprises permanent magnets.

13. A valve assembly as set forth in claim 11 wherein said elastically deformable diaphragm means resists valve stem displacement transverse to its longitudinal axis.

14. A valve assembly as set forth in claim 11 wherein said pair of diaphragm means preclude external fluid flow therepast.

15. A valve construction comprising
(a) a housing assembly having a fluid flow channel extending along the longitudinal axis thereof;
(b) a fluid entry port at one end of said channel, a fluid delivery port at the other end thereof and a valve seat disposed adjacent said fluid delivery port;
(c) a hollow valve stem forming a part of said fluid flow channel resiliently supported by a pair of spaced apart elastically deformable fluid impervious diaphragm members for channeling fluid flow through said valve stem and permitting displacement thereof parallel to said longitudinal axis intermediate a first limiting position having its dependent end disposed in sealing relation with said valve seat for preventing fluid flow therepast and a second limiting position with its dependent end disposed remote from said valve seat for permitting fluid flow therepast for discharge through said delivery port;
(d) inner and outer fixed cylindrical magnetic pole members disposed coaxial with said axis and in concentric spaced relation to each other defining an annulus therebetween;
(e) flux generating means for establishing a substantially constant magnetic flux across said annulus intermediate said pair of pole members in a direction substantially perpendicular to said axis; and (f) an armature assembly mounted on said valve stem intermediate said pair of diaphragm members for displacing the latter intermediate its first and second limiting positions, said armature assembly including a support member transversely mounted on said hollow valve stem intermediate the diaphragm members having a coil member mounted on its periphery and disposed in said annulus intermediate said pair of fixed magnetic pole members substantially perpendicular to the magnetic flux thereacross and directionally displaceable parallel to the longitudinal axis of said fluid flow channel in accord with the direction of electrical current flow therethrough.

16. A valve assembly as set forth in claim 15 wherein said elastically deformable diaphragm means includes a base plate portion, a hub portion disposed in liquid tight encircling relation with said hollow valve stem and a peripheral flange portion disposed in fixed sealing relation with a bore defining a portion of said fluid flow channel.

17. A valve assembly as set forth in claim 15 wherein said spaced apart elastically deformable diaphragm members normally bias said valve stem intermediate said first and second limiting positions in the absence of current flow through said coil member.

* * * * *